3,188,750
COMBINED AIR DRYING-FREEZE
DRYING PROCESS
Julius M. Davis, Bronx, and Richard A. Pfluger, Pearl
River, N.Y., assignors to General Foods Corporation,
White Plains, N.Y., a corporation of Delaware
No Drawing. Filed Nov. 25, 1960, Ser. No. 71,395
4 Claims. (Cl. 34—5)

This invention relates to a technique for drying. More specifically, it relates to a technique for drying biological materials including foods in manner to permit attainment of a product possessing a high degree of biological integrity.

It is well known that many foods are characterized by a very short storage life which may range from a few days up to a few months when the food has been harvested and stored under more-or-less standard conditions. As these foods are permitted to stand, in many cases the quality decreases: the flavor may begin to deteriorate substantially immediately after harvesting; the color may rapidly become unsatisfactory; and the texture may, because of biological activity, become undesirable. Presence of various bacteriological impurities may permit acceleration in the rate of deterioration. Dehydration resulting from contact with atmospheric air may undesirably dry the food and denature it to the point which renders it unsatisfactory. In view of all of these factors, it has proven to be difficult to satisfactorily dry foods.

Drying of foods has heretofore been attempted in numerous cases. Classically, fruits such as apricots, plums, etc., have been dried either by exposure to the sun or by contact with heated air in various types of equipment. In certain cases, typified by apples, attempts have been made to obtain a dried product by vacuum drying. In the case of liquid foods, typified by milk, eggs, tomato juice, or orange juice, attempts have been made to dry these materials by spray drying, drum drying, etc.

It is well known to those skilled-in-the-art that none of these attempts has been completely satisfactory. In no case does the dried food more than superficially resemble the fresh material from which it was prepared. In all cases, even under the most favorable conditions, reconstitution of the dried material by addition of water or other aqueous liquids has been undesirably slow; often it may take as long as several hours to reconstitute the dried product to a moisture content which approaches that of the fresh material.

In all cases, even under the most favorable conditions of reconstitution, the so-prepared product is inferior in quality. The texture is generally soft and limpid and at best only superficially resembles that desired. The taste of the reconstituted materials is less desirable than that of the raw material. In some cases the reconstituted product may be hard because of the unevenness of the rehydration, i.e. the outer shell may fail to rehydrate while the inner portions may absorb more than the desired amount of water.

In an attempt to remedy these defects and to produce a dehydrated product which is characterized by a high degree of biological integrity and by the ability to rehydrate quickly to form a reconstituted product which possesses substantially the same properties as were possessed by the undehydrated material, various techniques have been tried. Best known among these techniques is that of freeze drying. In typical freeze drying operations, the raw material preferably in the form of small particles is frozen to temperatures below the freezing point and even as low as the boiling point of liquid nitrogen. The so-frozen material may then be placed on a plate within an apparatus which is evacuated to pressures typically less than about 4 mm. of mercury and commonly down to 500–700 microns or lower. The frozen material, usually in the form of a monobed layer may be maintained within the apparatus under these conditions of operation for periods of time which commonly may approach 24 hours.

The product prepared by freeze drying may be generally satisfactory and may possess substantially all of the noted desiderata. More specifically, it commonly has: a fine texture approximating that of the fresh material from which it was prepared; an extended storage life; a high rate of reconstitution; and, when reconstituted, a texture which is generally similar to that of the fresh material from which it was prepared, and which is otherwise highly desirable. No other technique has heretofore been found which will consistently give such a desired product with numerous foods. However, as is well known, freeze-drying has not heretofore been generally considered to be a satisfactory solution to the problem of obtaining a dry product because it is characterized by numerous undesirable features. The very low temperatures of freezing and very low micron pressures of operation require expensive equipment not generally available, large capital outlay, and high operating costs.

The prime defect of freeze drying which has prevented it from becoming generally accepted is the low capacity of any economically-sized freeze dryer. This results from the extended period of time required to complete freeze drying and also from the need for employing either a monobed or at least extremely thin layers of material, as well as from the inordinately costly operating conditions; thus, for these reasons, as well as others which will be apparent to those skilled-in-the-art, freeze drying has not been considered as a desirable commercial process.

It is an object of this invention to provide a technique for obtaining a dehydrated material, typically a food, which in dehydrated form is characterized by a high degree of biological integrity. Other objects of this invention will be apparent to those skilled-in-the-art on inspection of the following description.

In accordance with certain aspects of this invention, the fresh materials to be dried may be dried by the process which comprises air-drying the material to a water content approaching its higher critical water content and freeze drying the air-dried material at least to its lower critical water content.

Although the fresh materials which may be treated in accordance with this invention may include any of a wide variety of naturally occurring, biological-type materials (including molds such as penicillin; blood including blood plasma; etc.), the advantages of this invention are most readily apparent when the fresh material is a food. Although it is possible to dry various types of fruits, vegetables, meats, and fish by practice of this invention, the preferred foods with which it may be employed may be: fruits, such as apples or pineapples; vegetables such as peas, carrots, potatoes, and pimentos; and fish, including tuna fish.

Although the fresh food may be employed in the form in which it occurs in nature, it is highly preferred that it be reduced to a particle size preferably less than about ½". In the case of apples, for example, satisfactory results may be obtained with cube-shaped particles, typically having an edge dimension of six millimeters; a smaller sized particle may be employed, for example, in the case of carrots, potatoes, etc. In the case of peas or beans, the individual peas or beans may be processed as received, or if desired they may be slit.

In practice of this invention in the preferred embodiment the fresh food, which may have been subdivided as hereinbefore indicated, may be pretreated. Preferably, pretreatment includes cooking to place the food in the desired cooked state, as well as to deactivate enzymes and to bacteriologically sterilize the raw material. Commonly pretreatment may include cooking for 5–30 minutes in water which may be at temperature of 165–212° F., commonly 185° F. In certain cases, typically potatoes, it may be desirable to effect pretreatment by cooking with steam, typically for 5 to 7 minutes. If desired, pretreatment may include contact with antioxidants typified by sodium bisulphite to minimize browning during subsequent treatment.

If desired, a toughening agent, typified by a solution having a concentration of 0.1%–1.0%, say 0.25% calcium chloride may be used as the pretreating solution to harden the cells. In the case of potatoes particularly, this may permit attainment of a product which is eminently satisfactory.

In practice of this invention, the so-pretreated raw material may be subjected to air drying.

In the preferred embodiment, the raw material may in the air-drying step, be in the form of a bed either stationary or agitated; this bed, when stationary may preferably, for example, be 0.25 inch to 1 inch thick. Although it will be understood that the temperature of the air with which the materials may be dried may be varied, it is preferred that it be at temperature above about 120° F. and below about 300° F.; most commonly at about 125–130° F. when the bed is stationary. If the bed is fluidized or agitated, the preferred temperature may be somewhat higher, preferably 160° F.–200° F. Pressure of operation in the air-drying step may be substantially atmospheric pressure. It may be as low as 100 mm. Hg or slightly higher than atmospheric pressure. In a preferred embodiment, the air may be passed over the materials or upwardly or downwardly through a stationary bed thereof for a period of 15 minutes to 2–3 hours, typically 15–20 minutes. During this period the water content of the material may be lowered from its initial value, typically 70%–95%, down to a point approaching the higher critical water content.

The higher critical water content, i.e. the lower limit of the water content of the material at the end of the air drying step may be defined as the water content of the material at the time when the temperature of the material (in the absence of non-convective heat transfer, i.e. heat transfer arising from e.g. radiant, dielectric, etc. sources) begins to rise above the adiabatic saturation temperature of the drying gas. It will be understood that this higher critical water content will vary for different materials, and that it may even vary somewhat for the same food depending upon the size of the particles, the pretreatment, the drying conditions including rate of drying, humidity, air velocity, bed depth, etc. In each case, however, the higher critical water content is reproducibly determined by the nature of the material. By way of example, the following may be noted:

(a) Apples: 5 mm. x 5 mm. x 2 mm. cubes blanched at 175° F.–185° F. for five minutes in water having a moisture content of 96% after draining, and dried by passing air at 120° F. upwardly through a 0.25 inch bed maintained on a vibrating screen; higher critical water content—ca. 75%.

(b) Peas: Fresh split peas, cooked in water at 200° F.–210° F. for eight minutes, quenched in cold water, drained to give a moisture content of about 82%, and dried in a belt through drier in contact with 160° F. air for 30 minutes; higher critical water content—ca. 54%.

(c) Carrots: 6 mm. raw cubes boiled for 25 minutes drained (to moisture content of 93%) and tunnel dried with cross-flow 130° F. air for 90 minutes; higher critical water content—ca. 70%.

(d) Tuna: Flaked cooked commercial water-packed canned tuna (moisture content, drained, of 65%) tunnel dried with cross-flow air at 130° F.–135° F. for 14 minues; higher critical water content—ca. 55%.

In the preferred embodiment, it will be preferred to conduct the air-drying step so that the water content of the material at the conclusion of air-drying may be 2%–3% above the higher critical water content. The invention may be practiced under conditions such that the water content after drying may be higher if desired, but no compensating advantage is thereby obtained. It is a feature of this invention that no particle of material should at the conclusion of this first step have a water content which is less than the critical percent. Particles having a water content below this point will be found (at the completion of the entire process) to possess undesirable characteristics as hereinafter set forth in greater detail.

It is a feature of this invention that the material may, if desired, be subjected to evaporative freezing to lower the temperature to that desired for the freeze drying step subject to the requirement that the moisture content after evaporative freezing be above the higher critical water content. When this evaporative freezing is effected as a portion of the air drying operation, the material may be frozen to e.g. 0° F. by subjecting it to pressures of 20–1000 microns, typically 500–700 microns for a time sufficient to lower the moisture content to a point approaching the higher critical water content. The so-frozen material at 0° F. may be passed to the freeze drying operation.

In the freeze drying operation the material may be frozen at temperatures below its freezing point, typically at a temperature of −320° F. to 25° F. for as long as 18 hours at the higher temperature and for correspondingly shorter times at the lower temperatures. At the end of this time, the material may be substantially, entirely frozen. The so-frozen material may then be placed within appropriate freeze-drying equipment (which may be a Stokes type freeze drier having hollow shelves heated with circulating fluid), preferably in the form of a bed having a depth of about 0.5–2 inches and typically one inch. A vacuum may be drawn on the apparatus so that the material is subjected to absolute pressure of 20–1000 microns, typically 500 to 750 microns. Plate temperature may be maintained at 70° F.–120° F. During the drying period of 2–8 hours, preferably about 4 hours, the water content of the material may be lowered from the starting point just above the higher critical water content.

It is a feature of this invention in the preferred embodiment that the freeze drying step be conducted for time and under conditions sufficient to lower the moisture content to at least as low as the lower critical water content. As this phrase is used in this application, it marks the water content of the material at the upper end of the falling period of the drying curve (under freeze drying conditions) of rate v. time. At the lower critical water content, it appears that all solid ice within the particle has disappeared, and the only water which is present within the particle may be that water which was originally non-freezable water. It may be possible to attain satisfactory dry product when the freeze drying operation is terminated at a moisture content above the lower critical water content; however consistent attainment of a superior product may be predicated upon freeze drying to below this lower critical water content.

It will be apparent that the lower critical water content of various foods may vary—for example, for the foods hereinbefore noted:

TABLE I

| Food: | Lower critical water Content, percent |
|---|---|
| Apples | ca. 60 |
| Peas | ca. 40 |
| Carrots | ca. 25 |
| Tuna | ca. 20 |

The freeze drying step will be effected so that at its conclusion, the terminal-water content of the material will be at least at, and preferably below, preferably 1%–2% below the lower critical water content. When the soobtained terminal water content is sufficiently low to impart desired storage life to the product, the product may be stored as such.

The desired terminal water contents of foods at which they may be stored for extended periods at atmospheric temperatures may be as follows:

TABLE II

| Food: | Terminal water content, percent |
|---|---|
| Apples | Less than ca. 2. |
| Peas | Less than ca. 4. |
| Carrots | Less than ca. 4. |
| Tuna | Less than ca. 2. |

When the desired terminal water content of the food is above the lower critical water content of Table I, the freeze-dried product may be stored for extended periods. Where the desired terminal water content of Table II is below the lower critical water content of Table I, as is the case with the foods listed, the material may preferably be subjected to further air-drying to at least the terminal moisture content.

The freeze dried material may then be subjected to a second air drying step to lower the moisture content of the material to the desired terminal water content, typically as shown in Table II. It is particularly significant that by decreasing the time of retention within the freeze-drying step, the over-all cost of drying may be considerably decreased.

The products prepared in accordance with this invention are characterized by the hereinbefore noted desirable characteristics. Most outstanding among these characteristics is the rehydration time. Peas for example prepared by the technique of the instant invention when added to boiling water, may reconstitute in a period of as little as 2 minutes to give peas which substantially duplicate fresh peas. In contrast, the closest prior art commercial product generally available under the name of dried split peas, had to be soaked in water overnight and then boiled for several hours before it was possible to obtain a rehydrated pea which scarcely resembled the original fresh pea from which it was prepared.

It may thus be observed when the process of this invention is practiced, and particularly when a material is freeze dried from above or about its higher critical water content down at least to its lower critical water content, that the product which may be obtained is characterized by its ease of reconstitution and by its superior properties upon reconstitution.

*Example I*

In accordance with one example of this invention, fresh peas at a moisture content of 74.3% pre-sized into size ranges 1–3 (passing through a 5/16 inch screen), may be passed through an Urschel Scarifier, a commercially available slitting device to produce a slit (about 1/8 inch long) in the shell of each pea. The slit pea may then be cooked in water at 200–210° F. for 8 minutes which may increase the moisture content to 82.0%. The cooked peas may then be quenched by placing them in cold water, and then draining to remove any excess water.

The cooked peas may then be air dried on a Belt Trough Dryer, a commercially available dryer. An inlet air temperature of 160° F. may be maintained and the peas retained in the dryer for 30 minutes. The peas, as removed from the air drying may have a moisture content of 56% $H_2O$. (In a preliminary experiment, it had been determined that the higher critical water content of so-treated peas was about 54%.)

Ten pounds of the partially dried peas may then be freeze dried by spreading on stainless steel trays at a thickness of one layer and frozen by placing the trays on Dry Ice for two hours. The trays may then be placed in a commercial shelf-type vacuum freeze dryer. The dryer may be operated at 100 to 500 microns pressure and a fluid temperature of 90° F. may be maintained circulating through the plates. After 5 hours the peas may be removed from the dryer at a moisture content of 40%. (In a preliminary experiment, it had been determined that the lower critical water content of these peas was about 40%.)

The peas may then be further air-dried in a tunnel dryer operating cross-flow air at a temperature of 120° F. for 16 hours. The final product may have a moisture content of 2%. So-dehydrated peas can be stored under a nitrogen atmosphere for an indefinitely long period. The product rehydrates completely in 2 minutes in simmering water and has the characteristic flavor, aroma, color, and texture of the freshly cooked peas which were used as the starting material.

*Example II*

In accordance with a second example of this invention, apples of the Greening variety may be manually peeled and cored and immersed in a solution of 1 part lemon juice to 4 parts water to retard discoloration. The apples may then be diced to 6 mm. cubes in a commercially available Diana Dicer. The diced apples may then be blanched in excess water at 175–185° F. for 5 minutes, quenched with cold water, and drained to remove excess water. The moisture content of the blanched dices may be 96%.

The blanched apple dices may then be air-dried in a Carrier vibrating dryer with air at a temperature of 125° F. The moisture content of the dices leaving the vibrating dryer may be 84%. (In a preliminary experiment, it had been determined that the higher critical water content of so-treated apples was about 75%.)

The dices may then be placed on stainless steel trays in a single layer bed depth and frozen by placing in a minus 20° F. storage area for 16 hours. The frozen dices may then be vacuum freeze dried in a commercially available shelf-type Stokes freeze dryer for 6 hours at a pressure of 100–500 microns and a shelf temperature of 90–110° F. Moisture content of the material leaving the freeze dryer was 55%. (In a preliminary experiment, it had been determined that the lower critical water content of so-treated apples was about 60%.)

The dices may then be further air-dried in a tunnel dryer for 16 hours employing air at 120° F. Final moisture content may be 2%. The resulting product can be stored indefinitely when packaged under a nitrogen atmosphere. The dehydrated dices so prepared rehydrate instantly in cool water and have the characteristic color, flavor, and texture of the original material.

*Example III*

This example illustrates a process comparable to that of Example II except that the process of the instant invention was not followed. Apples of the Greening variety were manually peeled and cored and immersed in a solution of 1 part lemon juice to 4 parts water to retard discoloration. The apples may then be diced to 6 mm. cubes in a commercially available Diana Dicer.

The diced apples may then be blanched in excess water at 175–185° F. for 5 minutes, quenched with cold water, and drained to remove excess water. The moisture content of the blanched dices may be 96%. The blanched dices were then air-dried in a Carrier vibrating dryer with air at a temperature of 125° F. The moisture content of the dices leaving the vibrating dryer was 66%. The predetermined higher critical moisture content of these apples was 75%; and the moisture content of 66% was considerably below this point. The dices may then be placed on stainless steel trays in a single layer bed depth and frozen by placing in a minus 20° F. storage area for 16 hours. The frozen dices may then be vacuum freeze dried for 16 hours at a pressure of 100–500 microns and a shelf temperature of 90–110° F. Moisture content from the freeze dryer was 1%. The dices so dehydrated were shrivelled and did not fully rehydrate within 10 minutes in cool water.

Example IV

In accordance with another example of this invention, commercial canned water-packed tuna fish, drained to give a moisture content of 65.41%, may be flaked and placed in a thin layer (approx. 1/8") in a conventional tunnel dryer. The fish may be dried for 14 minutes with cross-flow air at 130–135° F. to a moisture content of 59%. The tuna fish may then be frozen at 0° F., and freeze dried for 3 hours at a pressure below 500 microns in contact with plates maintained at 86° F. by circulating fluid. The moisture content at this stage may be 17.4%. The sample may be air dried in a tunnel dryer for 1 hour employing cross-flow air at 130–135° F. to give a resulting product which may rehydrate in less than 2 minutes in cold water and possessing good color, flavor, and texture.

Example V

This example illustrates a process comparable to that of Example IV, except that the process of the instant invention was not followed. Commercial canned tuna fish of the same variety as in Example IV may be treated exactly the same as that in Example IV except that the time of freeze drying may be reduced to 2 hours. The product from the freeze dryer may have a moisture content of 23.8%. After final air drying identical to that in Example IV, the product may be slow in rehydration and had a tough texture.

Although this invention has been described in connection with specific examples, it will be apparent to those skilled-in-the-art that various changes and modifications may be made which fall within the scope of this invention.

We claim:

1. The method of dehydrating a material to obtain a dehydrated organic material characterized by a high degree of biological integrity, extended storage life, and ease of reconstitution on rehydration yielding a product which closely approaches the material prior to dehydration comprising air drying the material to a water content approaching its higher critical water content, freeze drying the air-dried material at least to its lower critical water content, and air drying said material to a desired terminal water content lower than said lower critical water content, thereby obtaining a dehydrated material characterized by its high degree of biological integrity, extended storage life, and ease of reconstitution on rehydration to yield a product which closely approaches the material prior to dehydration.

2. A method of dehydrating fresh food material containing 70–90% of water which comprises air drying said material until the product temperature of the material begins to exceed the adiabatic saturation temperature of the drying gas, freezing the remaining freezable water in said material in the form of solid ice, freeze-drying said material to sublime said ice, and drying said material to reduce the non-freezable water to a stable level.

3. A method of dehydrating fresh food material containing 70–90% of water which comprises air drying said material until the water content of the material approaches less than 3% of that point wherein the product temperature of the material begins to exceed the adiabatic saturation temperature of the drying gas, cooling said material to freeze the freezable water in said material in the form of solid ice, freeze-drying said material to sublime said freezable water, continuing freeze-drying to remove 1–2% of the non-freezable water in said material, and drying said material to reduce the non-freezable water to a stable level.

4. A method of dehydrating fresh food material containing 70–90% of water which comprises subdividing said material to a particle size of less than one-half inch, air drying said material to a point wherein the material begins to exceed the adiabatic saturation temperature of the drying gas, evaporatively cooling said material to freeze the remaining freezable water in said material in the form of solid ice, freeze-drying said material to sublime said ice, and air-drying said material to reduce the non-freezable water to a stable level.

References Cited by the Examiner

UNITED STATES PATENTS

| | | | |
|---|---|---|---|
| 1,929,437 | 10/33 | McComb | 34—15 X |
| 2,493,062 | 1/50 | Flosdorf | 34—5 |
| 2,523,552 | 9/50 | Birdseye. | |
| 2,899,319 | 8/59 | Powers | 99—204 |

OTHER REFERENCES

Dehydration of Food, by Morris, published by D. Van Nostrand Co. Inc., New York, pages 23 and 47.

NORMAN YUDKOFF, *Primary Examiner.*

CHARLES O'CONNELL, *Examiner.*